US007787725B2

(12) United States Patent
Kahana et al.

(10) Patent No.: US 7,787,725 B2
(45) Date of Patent: Aug. 31, 2010

(54) FIBER OPTIC MICROPHONE AND A COMMUNICATION SYSTEM UTILIZING SAME

(75) Inventors: Yuvi Kahana, Rinatya (IL); Alexander Kots, Ashdod (IL); Alexander Paritsky, Modiin (IL)

(73) Assignee: Optoacoustics Ltd., Yehuda (IL)

( * ) Notice: Subject to any disclaimer, the term of this patent is extended or adjusted under 35 U.S.C. 154(b) by 0 days.

(21) Appl. No.: 12/262,857

(22) Filed: Oct. 31, 2008

(65) Prior Publication Data

US 2009/0123112 A1 May 14, 2009

(30) Foreign Application Priority Data

Nov. 8, 2007 (IL) .................................... 187223

(51) Int. Cl.
*G02B 6/00* (2006.01)
*G02B 6/26* (2006.01)
*G02B 6/42* (2006.01)
*B06B 1/06* (2006.01)
*H04B 10/02* (2006.01)
*H04B 10/12* (2006.01)

(52) U.S. Cl. .......................... 385/31; 385/13; 367/140; 398/134

(58) Field of Classification Search ................... 385/13, 385/31; 367/140; 398/134
See application file for complete search history.

(56) References Cited

U.S. PATENT DOCUMENTS 4,015,115 A * 3/1977 Corcoran ..................... 398/79
4,784,452 A * 11/1988 Hodge et al. .................. 385/48
5,640,459 A * 6/1997 Hedeen ....................... 381/75
5,771,091 A * 6/1998 Paritsky et al. ............. 356/4.01
5,877,732 A 3/1999 Ziarati
6,215,884 B1 * 4/2001 Parrella et al. .............. 381/190
6,704,592 B1 3/2004 Reynolds et al.
7,221,159 B2 5/2007 Griffiths et al.
7,283,860 B2 10/2007 Frazier et al.
2002/0037756 A1 * 3/2002 Jacobs et al. ................ 455/572
2005/0273000 A1 * 12/2005 Dinehart et al. ............. 600/410

(Continued)

OTHER PUBLICATIONS

Buchholz, J., et al.,"Optically Driven wireless Earplug for Communications and Hearing Protection," Proceeding of the 43rd Annual SAFE Association Symposium, pp. 1-5, Oct. 24-26, 2005.

*Primary Examiner*—Charlie Peng
*Assistant Examiner*—Jerry Blevins
(74) *Attorney, Agent, or Firm*—Las Ladas & Parry, LLP

(57) ABSTRACT

An arrangement for a fiber optic microphone having at least one pair of optical fibers, each having an input end portion and an output end portion made of a material having a critical refractive angle $\theta_{crit}$ and having a numerical aperture NA. The input end portion of a first fiber is connectable to a source of light and the output end portion of a second fiber is connectable to a photoelectrical transducer. Both end portions have an inner diameter, an axis and a rim. The input and output end portions are mutually affixed along a single plane with their rims touching each other at a point, the axes forming an angle $\alpha$ therebetween. The rims are cut with respect to the axis, at an angle in a plane perpendicular to the single plane and to a bisector of angle $\alpha$ at the point, where $\alpha = 2\times\theta_{crit} - \text{NA}$.

31 Claims, 5 Drawing Sheets

U.S. PATENT DOCUMENTS

| | | | | |
|---|---|---|---|---|
| 2007/0036484 | A1* | 2/2007 | Hyatt | 385/25 |
| 2008/0044036 | A1* | 2/2008 | Konchitsky | 381/71.1 |
| 2009/0245029 | A1* | 10/2009 | Kam | 368/10 |
| 2009/0245546 | A1* | 10/2009 | Youn et al. | 381/190 |

* cited by examiner

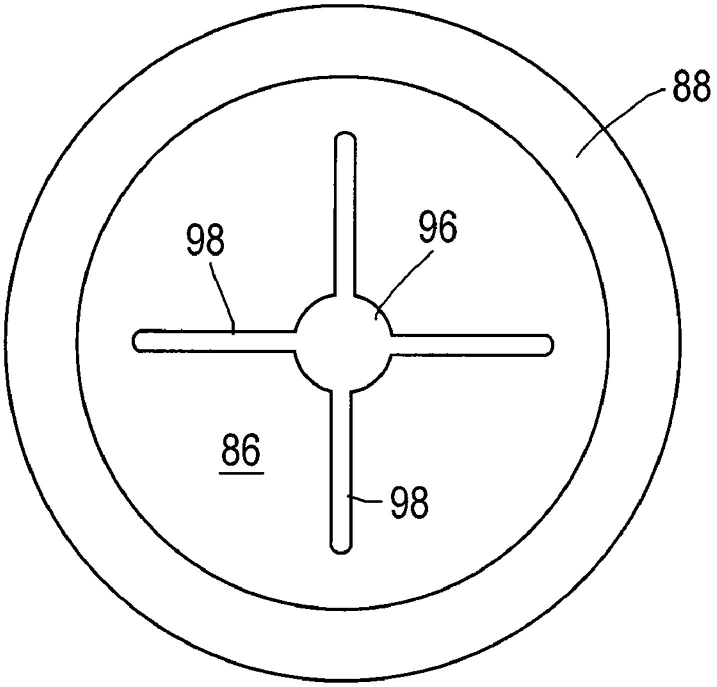
Fig.9
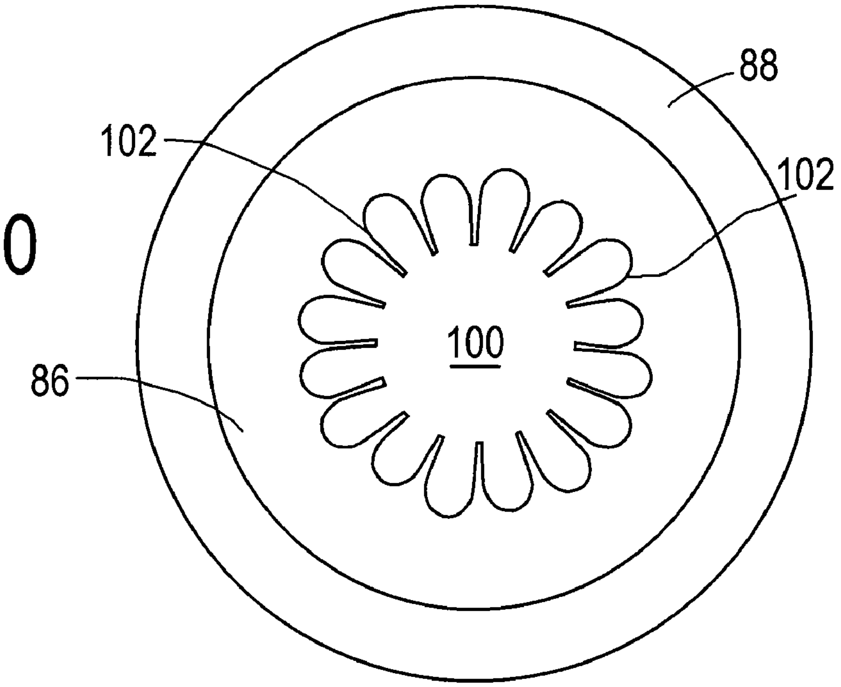
Fig.10
Fig.11
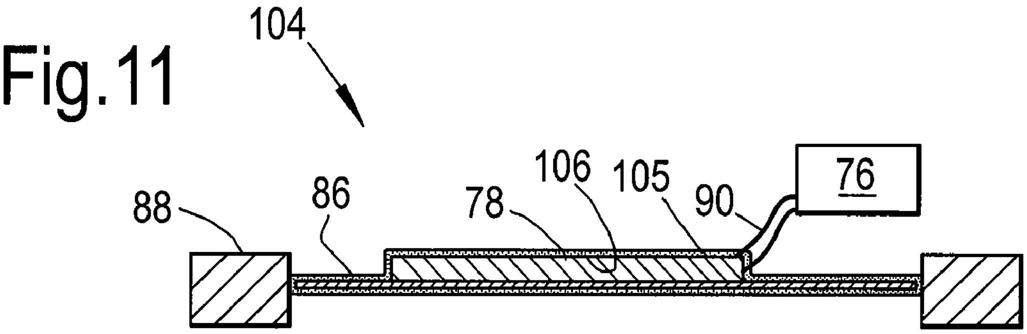

FIBER OPTIC MICROPHONE AND A COMMUNICATION SYSTEM UTILIZING SAME

FIELD OF THE INVENTION

The present invention relates to fiber optic microphones, fiber optic loudspeakers and communication systems, particularly to communication systems substantially not affected by electromagnetic fields, fields produced by magnetic resonance imaging (MRI), scanners, and the like equipment and to communication systems suitable for safe use in fire and explosion hazard environments.

BACKGROUND OF THE INVENTION

Fire and explosion environments are characterized by high risk of fire and explosion, resulting from even the smallest spark in an electrical communication system. MRI systems are characterized by very strong electromagnetic fields, preventing a metallic part to be utilized within the field. Moreover, any metal part in the proximity of an MRI system, as well as electrical wires in which electrical current is flowing, distorts MRI imaging, and thus, prevents obtaining reliable information of the inspected object.

In addition, during the operation of an MRI system or the like equipment, there prevails a strong acoustic noise that prevents any oral communication between the MRI patient and medical personnel in the control room. Such communication is very important during all stages of MRI tests performed on a patient. This need becomes even more important during interventional procedures aided by an MRI system, where doctors operate on a patient during MRI scanning.

Similarly, communication with personnel working in fire and/or explosion hazardous environments with a regular electrical communication system presents a big problem and is dangerous.

There are known U.S. Pat. Nos. 7,283,860; 7,221,159; 6,704,592.

In these patents different constructions of the system for communication between separated parts of the system for injection of a fluid medium into a patient within magnetic resonance imaging scanner (MRI) are described. The injector system includes a powered injector positioned within the isolation area and a system controller positioned outside the isolation area. The communication between the injector and the system controller are made by transmission of energy through the air. The energy is chosen so as not to create substantial interference with a MRI scanner positioned within the isolation area.

The energy can be electromagnetic energy outside the frequency range of the scanner (for example, RF energy above approximately 1 Gigahertz). The energy can also be vibrational energy, sonic energy or ultrasonic energy. Furthermore, the energy can be visible light or infrared light. In last case the connection may made via optical cabling with a first light transmitting device positioned on an interior side of the isolation barrier adjacent a viewing window in the isolation barrier. The second communication unit is in connection via optical cabling with a second light transmitting device positioned on the exterior side of the isolation barrier adjacent a viewing window in the isolation barrier. The first communication unit and the second communication unit communicate via transmission of optical energy between the first light transmitting device and the second light transmitting device.

There is also the possibility a special light transmitting energy system to said injector control unit in which the first light transmitting device can include a first lens assembly in communication with the first transmitter via optical cable and a second lens assembly in communication with the first receiver via optical cable. Likewise, the second light transmitting device can include a third lens assembly in communication with the second receiver via optical cable and a fourth lens assembly in communication with the second transmitter via optical cable. The first lens assembly and the third lens assembly are preferably in general alignment to enable communication between the first transmitter and the second receiver via transmission of light therebetween. Similarly, the second lens assembly and the fourth lens assembly are preferably in general alignment to enable communication between the first receiver and the second transmitter via transmission of light therebetween.

Reference is also made to a report titled "*Optically Driven Wireless Earplug for Communications and Hearing Protection*" by Jeffrey Buchholz et al published in the Proceedings of the Forty Third Annual SAFE Association Symposium, held in Salt Lake City, Utah, Oct. 24-26, 2005.

The report describes an optically driven earplug that eliminates the need for wire interconnects and earplug battery energy sources. Both the power to drive the earplug electronics and signals to and from the earplug are delivered optically through a free-space optical link to the outer layer of the double hearing protection. The optically driven earplug has been demonstrated to match the performance of a wire interconnect in both a listen-only earplug configuration and in two-way communication earplugs that can include ear canal Active Noise Reduction (ANR) with the addition of an ear canal microphone also driven through the optical interconnect. The wireless link was designed to be a local link to the individual's hearing protection or communications earmuff in a double hearing protection situation. The wireless link may replace the wired link needed for other active earplug implementations so as to improve ease of putting hearing protection on and taking it off, while maintaining a reliable two-way link to an active electronic earplug including an ear canal microphone without addition of energy sources in the earplug.

There is known a communication system with medical personnel from U.S. Pat. No. 5,877,732, entitled Three-Dimensional High Resolution MRI Video and Audio System and Method. This patent describes a system for MRI scanned patients utilizing acoustical tubes, which resembles sound communication systems on the old ships from the period when electrical communication was still unknown. Acoustical tubes may be made from non-metallic materials that have no interference with strong electromagnetic fields of an MRI system, although in this case, the source of sound is a non-magnetic audio signal generator using acoustical tubes for transmitting the audio signal to a headset. Even in this case, there remains the problem of strong background acoustical noise of plants and MRI systems that prevent any normal voice communication through the acoustical tubes. Moreover, acoustical tube communication is limited by non-mobile location of at least one end of the tube, and thus, cannot be used in the case of, e.g., an interventional MRI scanned system where the communication between medical personnel may be varied due to personnel movement during an operation, and sometimes due to the fact that the operation is not performed directly, but via a switchboard.

A fiber optics optical microphone is known from the U.S. Pat. No. 5,771,091, the teachings of which are incorporated herein by reference. This patent is based on the principle of a mirror galvanometer that uses an optical lever with the size of optical fibers, i.e., the size of several micrometers. In such conditions, to obtain high sensitivity with this kind of mirror galvanometer is a very difficult task. Nevertheless, U.S. Pat. No. 5,771,091 has improved sensitivity, albeit not sufficient for Hi-Fi use, by using very low optical energy and by use of different values of angles between optical fibers, different cut angle of optical fiber ends, different distances between sensor head and measuring medium and different forms of reflective surface of the measuring medium.

The disadvantages of this sensor and fiber optic microphone is its insufficient sensitivity for Hi-Fi use, the requirement of special processing of not always linear correlation between measured light power and the sound pressure, that requires special and complicated processing for its practical realization, the requirement of very high qualification from the workers and as a result, its high costs.

SUMMARY OF THE INVENTION

It is therefore a broad object of the present invention to provide relatively simple technological construction of fiber optic microphone adapted to be utilized in conjunction with fiber optic communication system, without any special processing.

It is also a broad object of the present invention to provide fiber optic microphone having high sensitivity.

It is a further broad object of the present invention to provide fiber optic directional and omni-directional microphones.

A still further broad object of present invention to provide a method of construction of a fiber optical microphone having high sensitivity.

A further broad object of the present invention to provide a reliable, fire/explosive proof, fiber optic communication system for use in hazardous environments and/or for use in MRI scanners enabling communication between personnel in environments of high risk of fire and/or explosion and strong acoustical noise.

It is a further object of the present invention to provide a reliable and simple fiber optic communication system to render communication between a patient and medical personnel during MRI scanning under strong electromagnetic fields and strong acoustical noise.

According to a first aspect of the present invention there is therefore provided an arrangement for a fiber optic microphone, comprising:

at least one pair of optical fibers, each having an input end portion and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle $\alpha$ therebetween, each of said rims being cut with respect to the respective axis at an angle which is in a plane perpendicular to said single plane and to a bisector of said angle $\alpha$ at said point;

wherein a is determined by the formula $\alpha=2\times\theta_{crit}-NA$.

In another aspect, the invention further provides a method for constructing an optical microphone having an optical fibers arrangement, said method comprising:

at least one pair of optical fibers, each having an input end portion and an output end portion, made of a material having a critical refractive angle $\theta_{crit}$ and having a numerical aperture NA;

the input end portion of a first optical fiber being connectable to a source of light and the output end portion of a second optical fiber being connectable to a photoelectrical transducer;

the output end portion of said first optical fiber and the input portion of said second optical fiber both having an inner diameter, an axis and a rim;

said input and output end portions being affixed with respect to each other along a single plane with their rims touching each other at a point, said axes forming an angle $\alpha$ therebetween; and each of said rims being cut with respect to the respective axis at an angle which is in a plane perpendicular to said single plane and to a bisector of said angle $\alpha$ at said point, $\alpha$ being determined by the formula $\alpha=2\times\theta_{crit}-NA$;

said method comprising:

disposing a membrane over the rims;

noting the numerical aperture (NA) of the first and second optical fibers;

calculating the angle $\alpha$ between the axis of the first and second optical fibers, and affixing the optical fiber portions with respect to each other at the calculated angle $\alpha$.

The invention still further provides a communication system, comprising:

at least one first optical sound-transducing unit including an optical fiber arrangement, comprising:

- at least one pair of optical fibers, each having an input end portion and an output end portion, made of a material having a critical refractive angle $\theta_{crit}$ and having a numerical aperture NA;
- the input end portion of a first fiber being connectable to a source of light and the output end portion of a second fiber being connectable to a photoelectrical transducer;
- the output end portion of said first fiber and the input portion of said second fiber both having an inner diameter, an axis and a rim;
- said input and output end portions being affixed with respect to each other along a single plane with their rims touching each other at a point, said axes forming an angle $\alpha$ therebetween, each of said rims being cut with respect to the respective axis at an angle which is in a plane perpendicular to said single plane and to a bisector of said angle $\alpha$ at said point, $\alpha$ being determined by the formula $\alpha=2\times\theta_{crit}-NA$;

said communication system further comprising:

at least one second optical sound-transducing unit, and one or more fiber optical communication lines interconnecting said first and second sound-transducing units.

BRIEF DESCRIPTION OF THE DRAWINGS

The invention will now be described in connection with certain preferred embodiments with reference to the following illustrative figures so that it may be more fully understood.

With specific references now to the figures in detail, it is stressed that the particulars shown are by the way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for fundamental understanding of the invention, the description taken with the drawings making apparent to those skilled in the art how the several forms of the invention may be embodied in practice.

In the drawings:

FIG. 1 is a schematic illustration of a sensor working principle, according to the present invention;

FIG. 2 is a schematic partly cross-sectional view of fiber optic microphone with moving surface, in accordance with working principles of the invention;

FIG. 3 is a schematic illustration of a fiber optic communication system, according to the present invention;

FIG. 4 is a schematic partly cross-sectional view of the fiber optic noise cancelling microphone system;

FIG. 5 is a schematic partly cross-sectional view of the noise cancelling microphone system, with a disposable pop-screen;

FIG. 6 is a schematic view of a fiber optic communication system with fiber optic loudspeaker;

FIGS. 7 to 10 are cross-sectional views of different embodiments of fiber optic loudspeakers, according to different embodiments of the present invention;

FIG. 11 is a schematic cross-sectional view of another embodiment of a microphone according to the present invention;

FIG. 12 is a schematic cross-sectional view of the fiber optic loudspeaker with a fiber optic omni-directional microphone for active noise control; and FIG. 13 is a schematic illustration of an embodiment of a communication system, according to the present invention.

DETAILED DESCRIPTION

Figure 1:
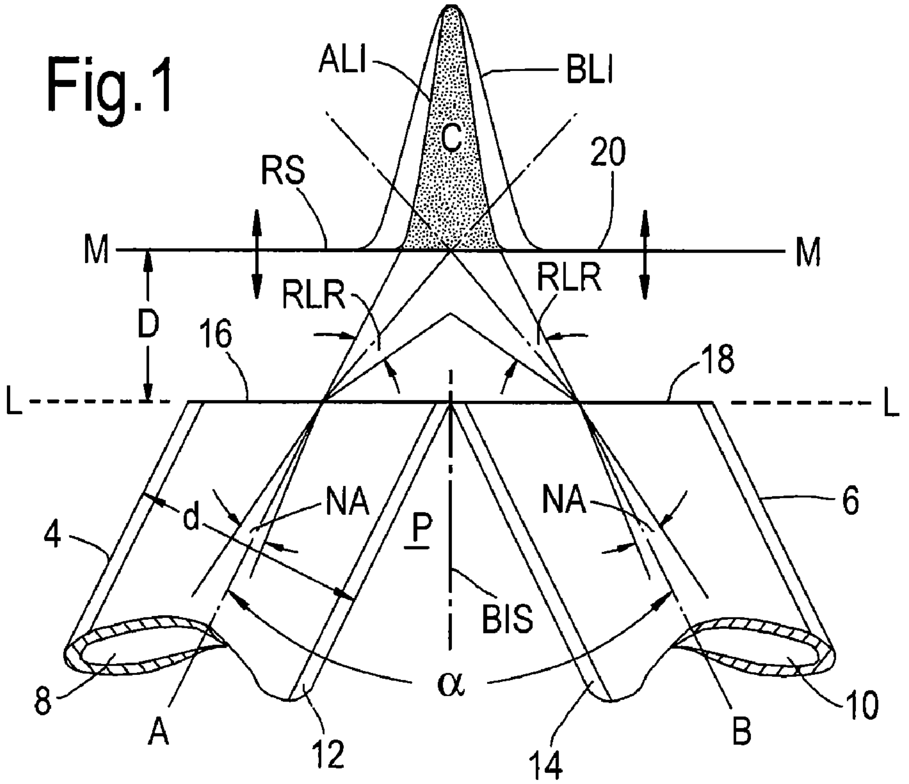

There is shown in FIG. 1 a schematic illustration of sensors, e.g., a microphone and its working principles, according to the present invention. Seen is a pair of optical fibers 4 and 6, having axes A and B arranged in plane P. The optical fibers include cores 8, 10 and claddings 12, 14. In a preferred embodiment, the optical fibers 4 and 6 touch each other by their claddings 12, 14 and are to assume angle $\alpha$ in between the axes A, B, that is equal to double their core material critical refraction angle value $\theta_{crit}$, minus the numerical aperture (NA) of the optical fibers 4 and 6, i.e., $\alpha=2\times\theta_{crit}-NA$. In the case of an optical fiber glass core, the critical refractive angle $\theta_{crit}$ depends on the type of glass used in the optical fibers and may be, for example about $\theta_{crit}=0.33$ rad or 37.5 degrees. In case of gradient optical fibers, NA depends on the optical fiber construction and may be, for example, about 0.11, and the angle $\alpha$ between the optical fibers $\alpha=2\times0.33-0.11=0.55$ rad or 63 degrees.

Light energy in an optical fiber does not move in one direction parallel to the axis of the optical fiber but is angularly dispersed in a similar manner to the way light of a projector is dispersed in air. The angle through which the light is dispersed in the optical fiber is termed NA. After refraction of light on the glass/air boundary, light power on the outside of the fiber is dispersed at an angle RLR that depends on the angle of the cut off of the optical fibers ends 16, 18. The cut-off of the optical fibers is made on a plane L-L referred to below as the cut-off plane that is perpendicular to the plane P of the optical fibers arrangement and to the bisector BIS of angle $\alpha$.

Also seen in FIG. 1 is plane M-M being the plane of a moving membrane 20 having a reflective surface. The plane M-M is parallel to the cut-off plane L-L of the optical fibers. Curves ALI and BLI schematically represent the light energy dispersion on the reflective surface of the membrane 20. The portion marked C is the only part of light energy that emerges from one of the optical fibers 4 and is reflected by the reflective surface of the membrane 20 into the other optical fiber 6.

During movement of the membrane 20, the distance D between the cut-off plane L-L of the optical fibers and the plane of the moving membrane M-M varies and the value of light energy C (light power) reflected from one of the optical fibers to another varies accordingly. When the distance D is less than a half of the diameter d of the optical fiber i.e. $D\leqq d/2$, the correlation between the variation in distance and the variation of light power is linear and there is no need for special processing of measurement results: $\Delta C=k\times\Delta D$, wherein k is a constant.

Figure 2:
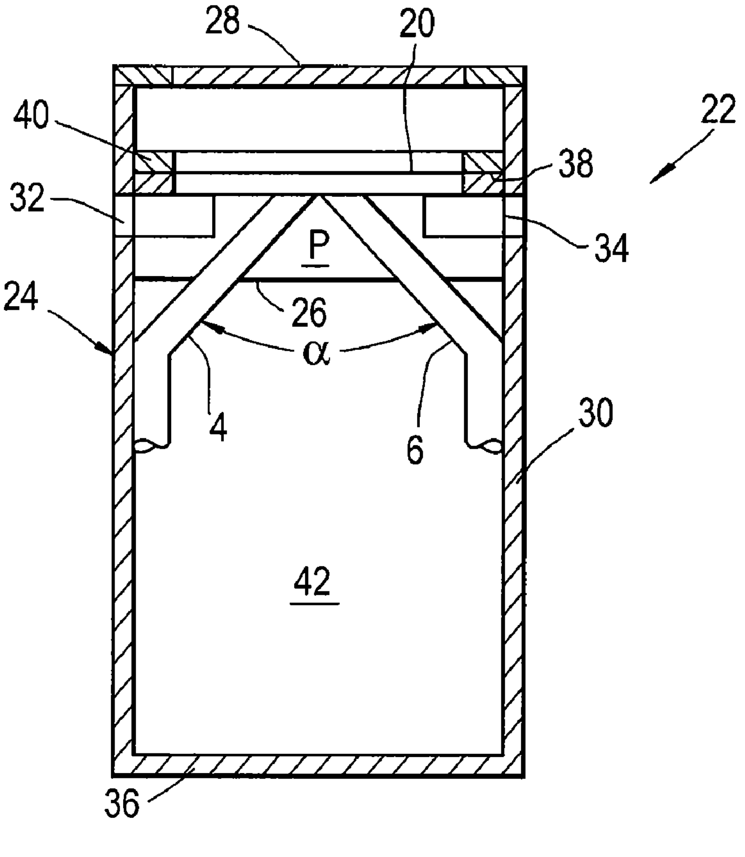

Referring to FIG. 2, there is illustrated an embodiment of a fiber optic microphone structure 22, including a housing 24 in which there is affixed or integrally made, a surface 26 extending in the plane P, in which, or to which, the optical fibers 4 and 6 are attached at an angle $\alpha$, with respect to each other. The housing 24 has an apertured top 28, through which sound emerges, side wall 30 (for a cylindrical housing), optionally having openings 32, 34 for allowing ambient sounds to enter the housing underneath the membrane 20, and a bottom wall 36. The membrane 20 is affixed along its periphery in the housing 24 between an annular spacer 38 and a ring 40. The distance between the membrane 20 and the cut-off plane L-L is determined by the height of the spacer 38.

Sound signals incoming through the housing 24 onto membrane 20, e.g., through the apertured top 28, impinge on the upper side of the membrane 20, while in the case of a unidirectional microphone, openings 32, 34 in the housing 24 allow sounds to impinge on the lower side of the membrane 20, as well. In this case the microphone 22 is sensitive for sound signal that is coming from the direction perpendicular to the plane M-M of the membrane 20 and is not sensitive to sound signals that are coming from the directions in plane M-M. The microphone's sensitivity distribution for sound signals from all other directions is of the form of the number eight with zero sensitivity in plane M-M and maximum sensitivity in the direction perpendicular to the M-M plane.

For an omni-directional microphone, openings 32, 34 have to be hermetically closed. In this case outer sounds are incoming onto the membrane 20 through the apertured top 28 only and the microphone is equally sensitive to sound that emanates from all directions.

Microphone membrane 20 is made from very light material such as from a thin aluminum leaf and affixed with any desired tension. As a result, its resonance frequency may be low. The main resonance characteristics of such a microphone depend on the air volume 42 in the housing 24. The air volume 42 depends, e.g., on the position of bottom wall 36 of housing 24 or from the distance between the bottom wall 36 and the plane M-M. It is possible to adjust the frequency characteristics of the fiber optic microphone 22, e.g., to set the frequency range of the membrane 20, by changing the volume 42 inside the housing, e.g., by moving the bottom wall 36 up or down, the tubular wall 30, using simple means (not shown).

The membrane 20 may optionally be made with or have a portion made of, high quality light-reflecting material or coating.

Figure 3:
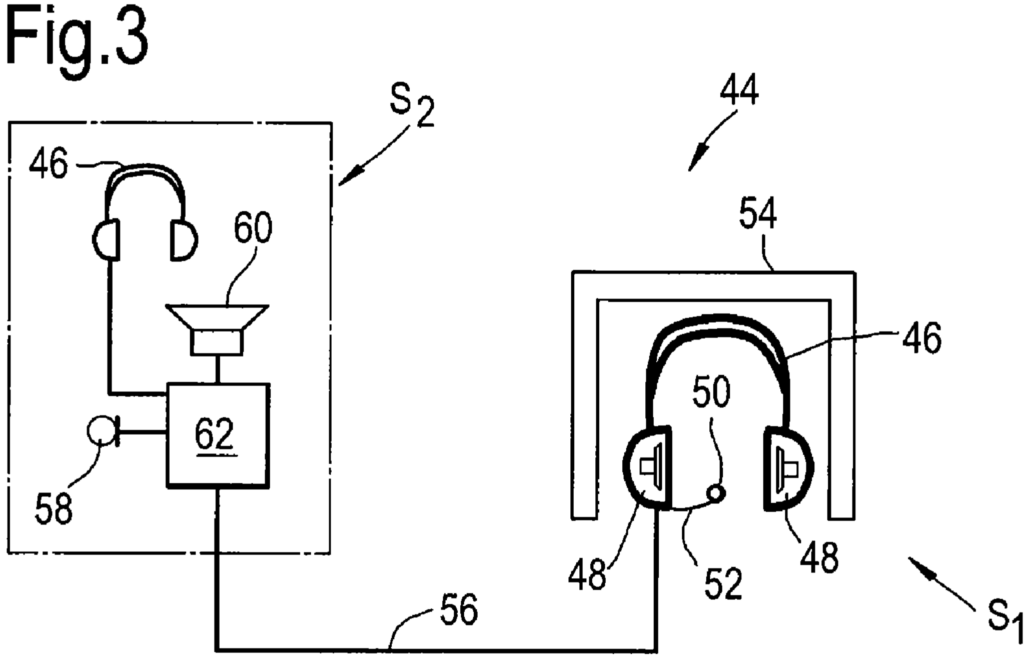

A communication system, advantageously used in strong electromagnetic fields and/or fire and explosion hazard environments and the like, according to the present invention, is illustrated in FIG. 3. In the embodiment shown, the system 44 includes, at one end, a sound transducer $S_1$, e.g., a headset 46 to be worn by a user, consisting of earphones 48 and a microphone 50, which may be attached to the headset by an arm 52. As further seen in FIG. 3, the headset 46 is disposed within an electromagnetic field-producing equipment 54, e.g., an MRI apparatus. The headset 46 communicates via an optical conduction line 56, e.g., a fiber optic line composed of a bundle of a plurality of fibers, with a second sound transducer $S_2$, including e.g., a microphone 58, a speaker 60 and/or a headset 46, all operated by a controller 62.

Figure 4:
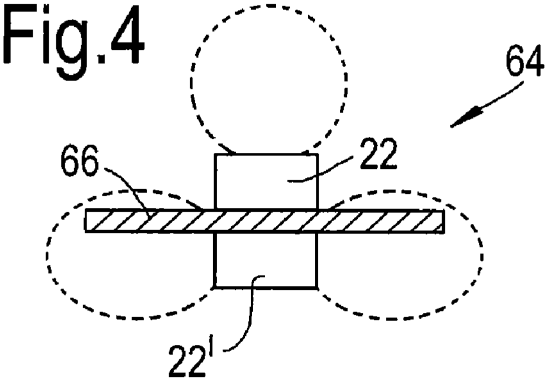

The optical microphones utilized in the system 44 may be of the type disclosed in FIG. 4. Such optical microphones do not include metal parts, and thus are suitable to be used in the communication systems of the present invention. The microphone unit 64 illustrated in FIG. 4 has two sensors, e.g., microphones 22, 22'separated by a partition 66. These two microphones, having sensitivity patterns as indicated by the broken lines, can be utilized in noisy environments, wherein the microphone 22'picks up the background noise and, by known techniques, is utilized to substantially eliminate the background noise picked up by the microphone 22.

Figure 5:
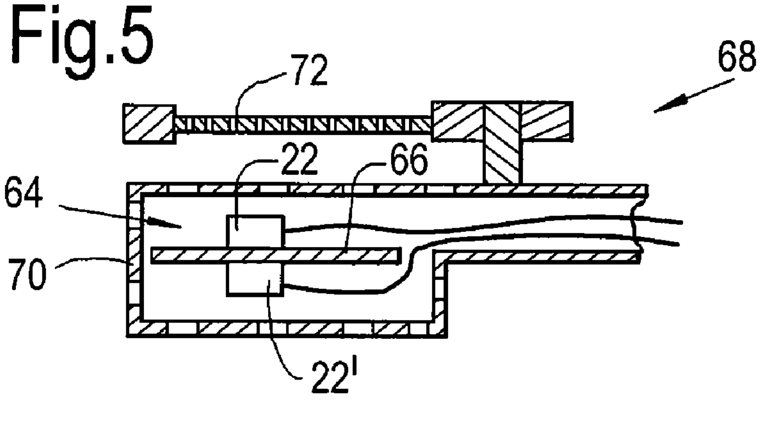

Referring to FIG. 5, there is illustrated the microphone unit 68 encased in a perforated housing 70, to which is affixed a disposable filter screen 72 (a hygienic pop-screen), especially useful for hygienic purposes in hospitals when the system is utilized with, e.g., the transducer $S_1$ (FIG. 3) for patients undergoing MRI scanning.

Figure 6:
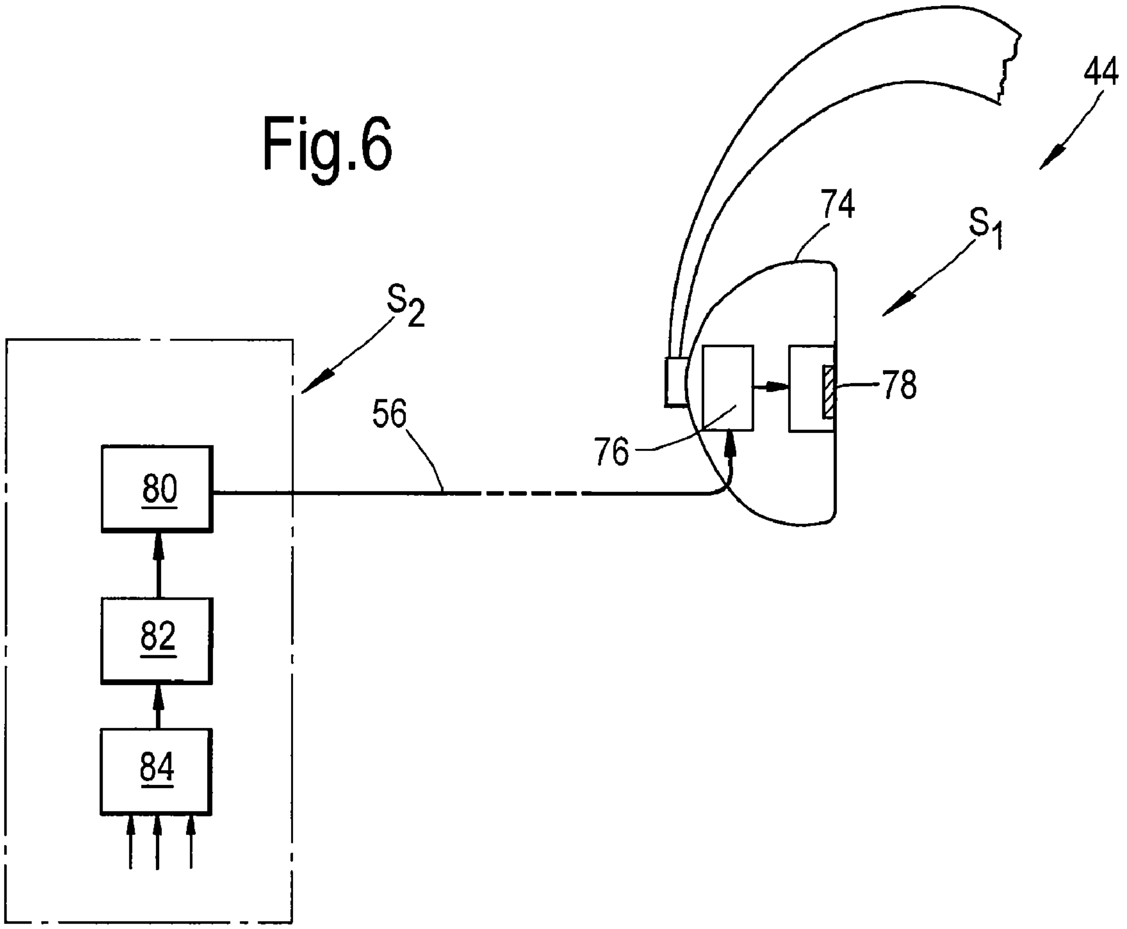

Turning now to FIG. 6, there is illustrated a communication system 44, wherein the transducer $S_1$ includes an optical speaker 74 consisting of a united photovoltaic cell 76 and a piezoelectric member 78. Constructional details of the fiber optic sound-transducing speaker 74 will be described below with reference to FIGS. 7 to 10. The optical speaker 74 is connected via fiber optic line 56 to a second transducer $S_2$ comprising a light source 80 controlled by a driver 82 receiving signals from a modulator 84. Sounds received by the modulator 84 modulate the light source 80 which emits corresponding light signals and transmits the signals through optical line 54 to a photoelectric cell 76. The photoelectric cell 76 applies the produced current to the piezoelectric member 78, which vibrates and produces sound energy.

Figure 7:
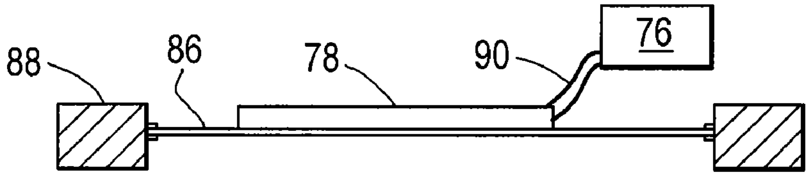
Figure 8:
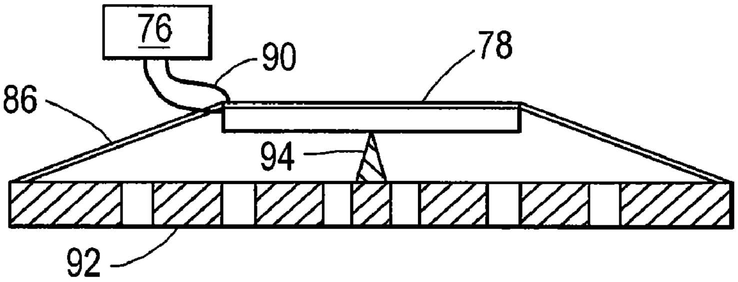

In order to achieve satisfactory sound output with the arrangement of FIG. 6, the piezoelectric member 78 has to be properly constructed, as exemplified in FIGS. 7 to 10. The simplest structure of the optical speaker is shown in FIG. 7. The piezoelectric member 78 is preferably disk-shaped attached to a membrane 86 stretched inside a rigid annulus 88. Very short electrical conductors 90 having a typical length of e.g., 1 to 2 mm connect the piezoelectric member 78 to the photocell 76. An improved quality speaker is illustrated in FIG. 8. Here, the membrane 86 of the piezoelectric member 78 is affixed to the rim of a disk-shaped perforated rigid plate 92 having a larger diameter than the diameter of the piezoelectric member 78, while a pin 94 disposed in the center of the plate 92, displaces the member 78 from the surface of the plate 92, forming a configuration of a truncated cone.

The piezoelectric member 78 need not be disk-shaped as shown in FIGS. 7 and 8. Alternatively, as illustrated in FIG. 9, the piezoelectric element 78 may be formed as a "propeller", namely having a central circular element 96 from which there are radially extending a plurality of arms 98, e.g., four arms in the configuration of a crucifix. Also this configuration of a piezoelectric member is mounted on a membrane 86 and affixed to the rim of a rigid annulus 88 (FIG. 7) or plate 92 (FIG. 8).

Still a further embodiment of a speaker 74 is illustrated in FIG. 10. The piezoelectric member 100 of this embodiment is shaped as a sunflower. The gaps between the "leaves" may be filled with a high viscosity gel 102. During movement of the membrane 86 on which the piezoelectric member 100 is mounted, the mutual displacement of the "leaves" is damped by the gel 102, resulting in a smoother frequency response, i.e., better sound quality.

FIG. 11 illustrates an optical headphone similar to the one illustrated in FIG. 7 in which a special filter screen set 104 is arranged to neutralize even the smallest electromagnetic irradiation produced by a piezoelectric member 78. The screen set 104 is made in the form of an envelope that is made of a conducting material such as aluminum foil 105 wrapped around piezoelectric member 78. There is also provided an insulating layer 106 under the aluminum foil 105, to avoid any electric conduction contact between piezoelectric member 78 and the aluminum foil 105.

Figure 12:
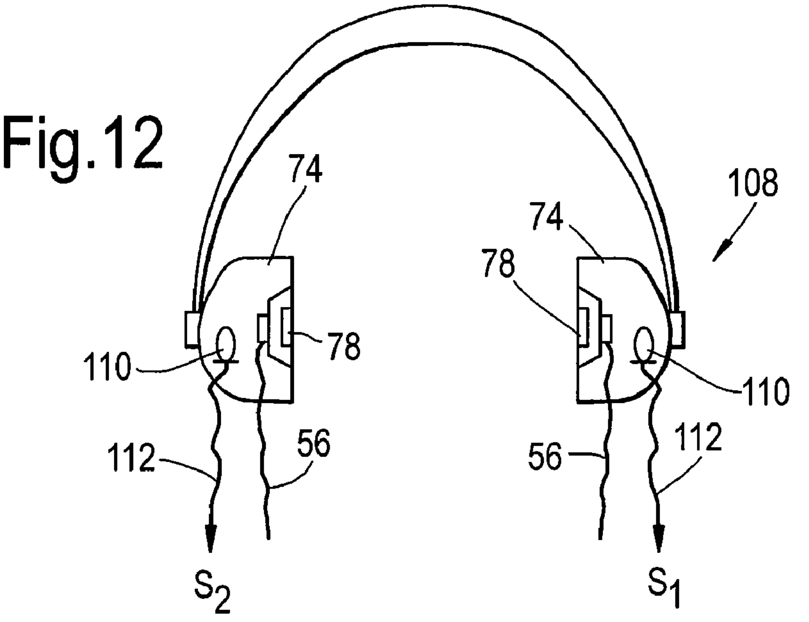

An improved sound quality of an optical headphone 108 is illustrated in FIG. 12. The quality of sound is improved by an active noise control suppressor. This is effected by installing in each of the headphone speakers 74 an optical microphone 110, which microphone picks up the prevailing noise. The noise signals are transmitted via optical conduction lines 112 to the arrangement $S_2$ (80, 82, 84) described with respect to FIG. 6; however here, the modulator 84 modulates the signals in opposite phase. The opposite phase signals are then transmitted via optical conduction lines 56 to each of the photovoltaic cells 76 which activate the piezoelectric members 78 of the speakers to produce background noise-free sound.

Figure 13:
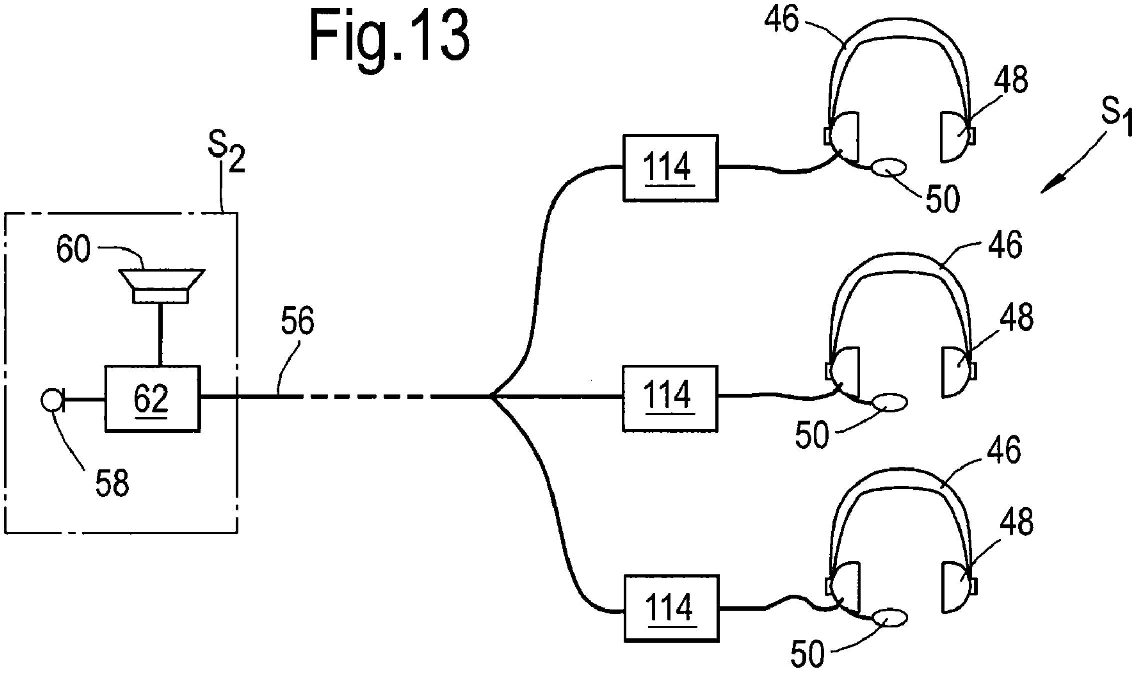

FIG. 13 illustrates a communication system according to an embodiment of the present invention. The communication system is utilized between several persons each wearing a headset 46, each optically connected through an optically-activated control unit 114 and via the optical conduction line 56 to the second transducer $S_2$.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An arrangement for a fiber optic microphone, comprising:

at least one pair of optical fibers, each having an input end portion, and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle $\alpha$ therebetween, an acoustically vibratable membrane being disposed in a housing in spaced-apart relationship to the rims;

each of said rims being cut in a plane perpendicular to said single plane and to a bisector of said angle $\alpha$ at said point;

wherein:

$\alpha$ is determined by the formula $\alpha=2\times\theta_{crit}-NA$; and the membrane is affixed in the housing at a distance from said rims of less than one half the inner diameter of the input and output portions of said optical fibers.

2. The arrangement as claimed in claim 1, wherein said housing includes an apertured top wall.

3. The arrangement as claimed in claim 2, wherein said housing further including at least one aperture on one side of said housing over said membranes and the rims.

4. The arrangement as claimed in claim 1, wherein said housing under the lower surface of the membrane has a volume and said volume is predetermined to set the frequency range of the membrane.

5. The arrangement as claimed in claim 1, wherein said membrane is made of, or has a portion made of, high quality light-reflecting material or coating.

6. A method for constructing an optical microphone having an optical fibers arrangement, said optical fibers arrangement comprising:

at least one pair of optical fibers, each having an input end portion, and an output end portion, made of a material having a critical refractive angle $\theta_{crit}$ and having a numerical aperture NA;

the input end portion of a first optical fiber being connectable to a source of light and the output end portion of a second optical fiber being connectable to a photoelectrical transducer;

the output end portion of said first optical fiber and the input portion of said second optical fiber both having an inner diameter, an axis and a rim;

said input and output end portions being affixed with respect to each other along a single plane with their rims touching each other at a point, said axes forming an angle $\alpha$ therebetween;

each of said rims being cut with respect to the respective axis at an angle which is in a plane perpendicular to said single plane and to a bisector of said angle $\alpha$ at said point, $\alpha$ being determined by the formula $\alpha=2\times\theta_{crit}-NA$;

said method comprising:

disposing an acoustically vibratable membrane in spaced-apart relationship to the rims at a distance from said rims of less than one half the inner diameter of the input and output portions of said optical fibers;

noting the numerical aperture (NA) of the first and second optical fibers;

calculating the angle a between the axis of the first and second optical fibers, and affixing the optical fiber portions with respect to each other at the calculated angle $\alpha$.

7. The method as claimed in claim 6, further comprising the step of causing said rims to touch each other prior to affixing the optical fiber portions at an angle $\alpha$ with respect to each other.

8. A communication system, comprising:

at least one first optical sound-transducing unit including an optical fiber arrangement, comprising:

at least one pair of optical fibers, each having an input end portion, and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle $\alpha$ therebetween, an acoustically vibratable membrane being disposed in a housing in spaced-apart relationship to the rims;

each of said rims being cut with respect to the respective axis at an angle which is in a plane perpendicular to said single plane and to a bisector of said angle $\alpha$ at said point, $\alpha$ being determined by the formula $\alpha=2\times\theta_{crit}-NA$; and the membrane being affixed at a distance from said rims of less than one half the inner diameter of the input and output portions of said optical fibers;

said communication system further comprising:

at least one second optical sound-transducing unit, and one or more fiber optical communication lines interconnecting said first and second sound-transducing units.

9. The system as claimed in claim 8, wherein said at least one first optical sound transducing unit or said at least one second optical sound-transducing unit is driven by a photovoltaic cell.

10. The system as claimed in claim 9, wherein said photovoltaic cell is energized by light signals received from said optical communication line.

11. The system as claimed in claim 8, wherein said second optical sound-transducing unit includes a light source controlled by a driver receiving signals from a sound modulator.

12. The system as claimed in claim 8 comprising a plurality of said first optical sound-transducing units, each connected to said second optical sound-transducing unit via an optically-activatable control unit.

13. The system as claimed in claim 8, wherein said first unit comprises a fiber optic microphone.

14. The system as claimed in claim 13, wherein said fiber optic microphone includes a patient hygienic pop-screen.

15. The system as claimed in claim 13, wherein said fiber optic microphone is a directional microphone.

16. The system as claimed in claim 8, wherein said first sound- transducing unit is a headset.

17. The system as claimed in claim 16, wherein said headset comprises noise-suppression elements.

18. The system as claimed in claim 8, wherein said second sound-transducing unit comprises a fiber optic microphone.

19. The system as claimed in claim 8, wherein said second sound-transducing unit comprises an optically-activatable speaker.

20. The system as claimed in claim 19, wherein said optical speaker comprises a photovoltaic cell electrically united with an audio transducer.

21. The system as claimed in claim 20, wherein said audio transducer comprises a piezoelectric member.

22. The system as claimed in claim 21, wherein said piezoelectric member is affixed on a membrane.

23. The system as claimed in claim 22, wherein said membrane is attached to a rigid annulus.

24. The system as claimed in claim 22, wherein said membrane is attached to a rim of a perforated plate and spaced-apart from a surface thereof by a pin.

25. The system as claimed in claim 22, wherein said piezoelectric member is configured in the form of a propeller.

26. The system as claimed in claim 22, wherein said piezoelectric member is configured as sunflower leaves.

27. The system as claimed in claim 26, wherein gaps between said sunflower leaves are filled with high viscosity gel.

28. The system as claimed in claim 22, wherein said piezoelectric member is wrapped by a conductive envelop.

29. An arrangement for a fiber optic microphone, comprising:

at least one pair of optical fibers, each having an input end portion, and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle $\alpha$ therebetween, each of said rims being cut in a plane perpendicular to said single plane and to a bisector of said angle $\alpha$ at said point;

wherein:

$\alpha$ is determined by the formula $\alpha=2\times\theta_{crit}-NA$; and said housing under the lower surface of the membrane has a volume and said volume is predetermined to set the frequency range of the membrane.

30. A communication system, comprising:

at least one first optical sound-transducing unit including an optical fiber arrangement, comprising:

at least one pair of optical fibers, each having an input end portion, and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle a therebetween, an acoustically vibratable membrane attached to a rigid annulus in spaced-apart relationship to the rims;

each of said rims being cut with respect to the respective axis at an angle which is in a plane perpendicular to said single plane and to a bisector of said angle $\alpha$ at said point, $\alpha$ being determined by the formula $\alpha=2\times\theta_{crit}-NA$;

said communication system further comprising:

at least one second optical sound-transducing unit, and one or more fiber optical communication lines interconnecting said first and second sound-transducing units.

31. A communication system, comprising:

at least one first optical sound-transducing unit including an optical fiber arrangement, comprising:

at least one pair of optical fibers, each having an input end portion, and an output end portion, made of a material having a critical refractive angle $\theta_{crit}$ and having a numerical aperture NA;

the input end portion of a first fiber being connectable to a source of light and the output end portion of a second fiber being connectable to a photoelectrical transducer;

the output end portion of said first fiber and the input portion of said second fiber both having an inner diameter, an axis and a rim;

said input and output end portions being affixed with respect to each other along a single plane with their rims touching each other at a point, said axes forming an angle $\alpha$ therebetween, an acoustically vibratable membrane attached to a rim of a perforated plate and spaced-apart from a surface thereof by a pin;

each of the rims of said input and output end portions being cut with respect to the respective axis at an angle which is in a plane perpendicular to said single plane and to a bisector of said angle a at said point, a being determined by the formula $\alpha=2\times\theta_{crit}-NA$;

said communication system further comprising:

at least one second optical sound-transducing unit, and one or more fiber optical communication lines interconnecting said first and second sound-transducing units.

* * * * *